Aug. 17, 1926.
J. W. REMINGTON
ANIMAL TRAP
Filed Sept. 19, 1923
1,596,686
Fig. I
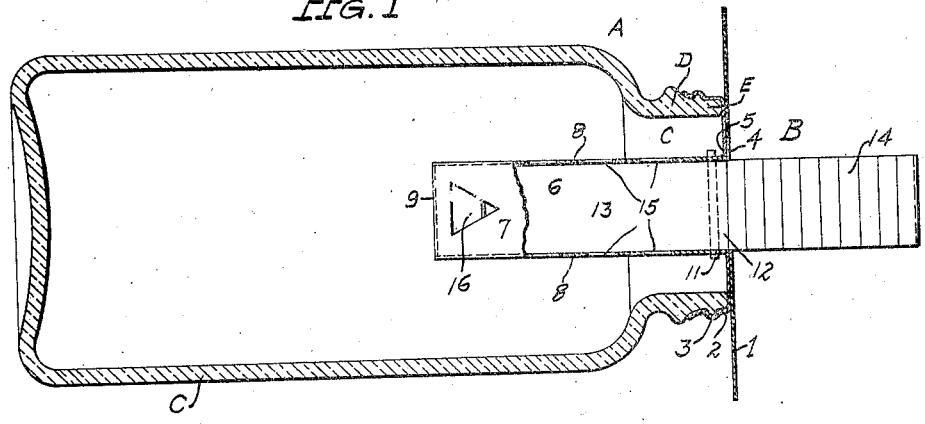
Fig. II
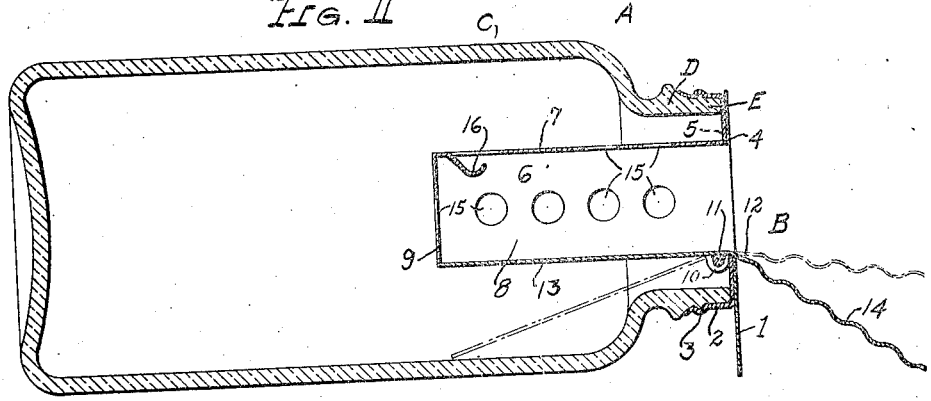
Fig. III
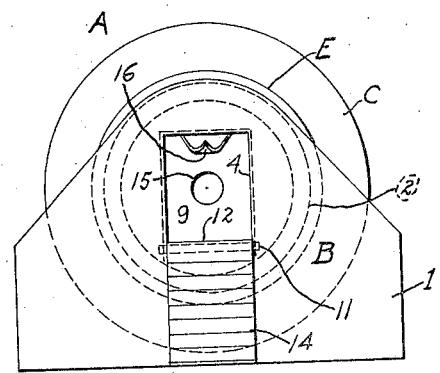
INVENTOR
J.W. REMINGTON
BY
ATTORNEYS Patented Aug. 17, 1926.

1,596,686

UNITED STATES PATENT OFFICE.

JAMES W. REMINGTON, OF BROWNWOOD, TEXAS.

ANIMAL TRAP.

Application filed September 19, 1923. Serial No. 663,537.

This invention relates generally to animal traps and particularly to a trap which is intended for use in catching mice, the purpose being to produce a simple and inexpensive trapping device which may be associated with an ordinary Mason jar to produce a very efficient trap.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claim hereunto appended.

Fig. I is a horizontal sectional view of my improved mouse trap.

Fig. II is a vertical section of the trap illustrated in Fig. I.

Fig. III is a front elevation of my improved mouse trap.

In the drawing A designates my improved mouse trap which comprises a trapping device B, which is attached to an ordinary Mason jar C of the type now in general use. As is well known, most Mason jars are provided with neck portions such as that designated by the reference character D, and these neck portions are usually provided with integral screw threads such as those indicated by the reference character E.

The trapping device of my improved trap comprises an outer supporting wall 1, the lower end of which rests upon the floor. Secured in any convenient manner to the wall 1 at its inner face is a jar cover 2 provided with integrally formed screw threads 3 of a size and pitch corresponding to the size and pitch of the screw threads E on the jar. The wall 1 and the jar cover 2 are provided with rectangular apertures 4 and 5 which register with each other. Secured to the wall 1 and the jar cover 2 in any convenient manner, as, for instance, by means of solder, is an elongated housing 6, said elongated housing comprising a fixed top wall 7, fixed side walls 8 and a fixed end wall 9. As will be seen by referring to Fig. II of the drawing, the elongated housing 6 is open at its outer end and said housing is not provided with a fixed lower wall.

Extending downwardly from the side walls 8 of the elongated housing 6 is a pair of oppositely disposed ears 10. The ears 10 support a pin 11 which is capable of oscillating in apertures formed in said ears. Secured to the oscillatory pin 11 is a member 12 which comprises a platform portion 13 and a runway portion 14. The platform portion 13 of the member 12 constitutes the lower wall of the elongated housing 6 when said member 12 is in its normal position, and the runway portion, which is corrugated to provide means for an animal obtaining a footing thereon, extends at an inclination from the lower wall of the aperture 4 in the wall 1 to the floor. The member 12 is pivotally supported in the ears 10 and the runway portion of said member is of such weight and is so positioned relative to the platform portion thereof that said platform portion will be normally drawn upwardly so that it closes the open lower portion of the elongated housing 6. When the platform portion 13 of the member 12 is in a position where it closes the lower portion of the elongated housing the portion 14 of said member will form an inclined runway which leads to the open outer end of said elongated housing.

The walls 7, 8 and 9 of the elongated housing 6 are provided with apertures 15 which permit air to enter the Mason jar C and said wall 7 is provided with an integral hook 16 which is adapted to receive suitable bait.

In the use of my improved trap suitable bait will be placed on the hook 16 and the trap will be placed in position with the member 12 arranged as shown in Fig. II. A mouse attracted by the bait will move up the inclined runway 14 and will pass into the elongated housing. As soon as the mouse has passed beyond the pivot pin 11 the weight of said mouse will cause the platform portion 13 of the member 12 to move downwardly, thereby causing the mouse to be dropped into the jar C. After the mouse has been dropped into the jar the member 12 returns to its normal position, thereby closing the lower portion of the elongated housing 6 and rendering it impossible for said mouse to get out of said jar.

An important advantage of my trap over the traps now in general use is that the trapping device B may be attached to most Mason jars, the jar cover 2 of said trapping device being of the standard size, and in the event the jar is broken it will be very little trouble to supply another jar.

I claim:

An animal trap comprising a glass jar provided with a portion having screw threads and a trapping device having a portion provided with screw threads adapted to cooperate with the screw threads on said glass jar to attach said trapping device to said glass jar, said trapping device comprising a vertical wall, an elongated housing open at its outer end supported by said vertical wall, a bait-receiver within said elongated housing, a runway leading to the open end of said elongated housing and adapted to contact with the article on which the animal trap rests and a pivoted bottom wall in said elongated housing adapted to be tipped downwardly under the weight of an animal to drop said animal into said glass jar, said runway and said pivoted bottom wall being formed integral with each other and being movable as a unit.

In testimony that I claim the foregoing I hereunto affix my signature.

JAMES W. REMINGTON.